United States Patent
Hegler et al.

(10) Patent No.: US 11,092,268 B1
(45) Date of Patent: Aug. 17, 2021

(54) WEDGED PROTRUSION PROFILE FITTING SEAL SYSTEMS AND METHODS

(71) Applicant: Trinity Bay Equipment Holdings, LLC, Houston, TX (US)

(72) Inventors: Matthew Allen Hegler, Kingwood, TX (US); Christopher Grover Scoggins, Katy, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/072,300

(22) Filed: Oct. 16, 2020

Related U.S. Application Data

(63) Continuation of application No. 16/791,698, filed on Feb. 14, 2020, now Pat. No. 10,837,582.

(51) Int. Cl.
  *F16L 21/03* (2006.01)

(52) U.S. Cl.
  CPC .................. *F16L 21/03* (2013.01)

(58) Field of Classification Search
  CPC ......... F16L 21/03; F16L 21/04; F16L 21/045; F16L 13/142; F16L 13/143
  USPC ..................... 285/256, 382, 382.7
  See application file for complete search history.

(56) References Cited

U.S. PATENT DOCUMENTS

| | | | |
|---|---|---|---|
| 2,374,226 A * | 4/1945 | Melsom | F16L 33/207 285/256 |
| 2,453,997 A | 11/1948 | MacWilliam | |
| 2,572,645 A | 10/1951 | Melsom | |
| 3,414,961 A | 12/1968 | Bjalme | |
| 3,592,481 A | 7/1971 | Jeffery | |
| 3,689,111 A | 9/1972 | Osmun et al. | |
| 3,689,112 A | 9/1972 | Slator et al. | |
| 4,345,361 A | 8/1982 | Baumann | |
| 4,593,942 A | 6/1986 | Loker | |
| 4,757,588 A | 7/1988 | Churchich | |
| 6,199,915 B1 | 3/2001 | Becker | |
| 8,341,816 B1 | 1/2013 | Swinford | |
| 2002/0024218 A1 | 2/2002 | Manuli | |
| 2002/0163191 A1 * | 11/2002 | Muenster | F16L 37/0926 285/382 |
| 2006/0071469 A1 * | 4/2006 | Romanelli | F16L 33/2076 285/256 |

(Continued)

FOREIGN PATENT DOCUMENTS

EP 1837581 A2 9/2007

*Primary Examiner* — David Bochna
(74) *Attorney, Agent, or Firm* — Conrad J. Hsu

(57) ABSTRACT

Techniques for implementing a pipeline system including a pipe fitting, which includes a fitting shell that define a fitting bore and a tubing cavity around the fitting bore. The tubing cavity interfaces with pipe segment tubing to facilitate fluidly coupling the fitting bore to a pipe bore. The fitting shell includes a seal groove that is recessed into a fitting shell surface that facilitates defining the tubing cavity. The pipe fitting includes a belt seal having a multisided axial cross-section profile, in which the belt seal is to be disposed in the seal groove to implement a fitting seal in the pipe fitting that includes a protruding portion having a wedge-shaped axial cross-section profile that protrudes beyond the fitting shell surface into the tubing cavity to facilitate sealing a fluid conduit implemented in an annulus of the pipe segment tubing in the tubing cavity of the pipe fitting.

18 Claims, 6 Drawing Sheets

(56) References Cited

U.S. PATENT DOCUMENTS

2017/0122469 A1    5/2017  Salehi-Baktiari
2017/0198855 A1*   7/2017  Baach .................... F16L 21/03

* cited by examiner

WEDGED PROTRUSION PROFILE FITTING SEAL SYSTEMS AND METHODS

CROSS-REFERENCE

The present disclosure is a continuation of U.S. patent application Ser. No. 16/791,698, entitled "WEDGED PROTRUSION PROFILE FITTING SEAL SYSTEMS AND METHODS" filed on Feb. 14, 2020, and issued as U.S. Pat. No. 10,837,582, which is incorporated herein by reference in its entirety for all purposes.

BACKGROUND

The present disclosure generally relates to pipeline systems and, more particularly, to a pipe fitting that may be deployed (e.g., installed) in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a bore that provides a primary fluid conveyance (e.g., flow) path through the pipe segment. Additionally, a pipe segment may generally be secured and sealed in one or more pipe fittings to facilitate fluidly coupling the pipe segment to another pipe segment, a fluid source, and/or a fluid destination.

To facilitate securing a pipe segment therein, in some instances, a pipe fitting may include a fitting shell, which is implemented to define (e.g., enclose) a tubing cavity to be used to interface with tubing of the pipe segment. In other words, in such instances, the tubing of the pipe segment may be secured in the tubing cavity of the pipe fitting, for example, at least in part by inserting (e.g., sliding) the pipe segment tubing into the tubing cavity and conformally deforming (e.g., swaging) at least a portion of the fitting shell around the pipe segment tubing. Additionally, to facilitate sealing pipe segment tubing in the tubing cavity, in some instances, a fitting seal may be coupled to the fitting shell such that at least a portion of the fitting seal protrudes (e.g., extends) into the tubing cavity. Due at least in part to its protrusion, the fitting seal may engage (e.g., contact and/or press against) pipe segment tubing present in the tubing cavity and, thus, facilitate blocking fluid from flowing past the fitting seal. However, at least in some instances, implementing a fitting seal that protrudes into a corresponding tubing cavity of a pipe fitting may potentially affect (e.g., reduce) its sealing integrity and, thus, perceived quality of the pipe fitting, for example, due to the protrusion inadvertently resulting in the fitting seal being displaced when pipe segment tubing is being inserted into the tubing cavity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe fitting. The pipe fitting includes a fitting shell that define a fitting bore through the pipe fitting and a tubing cavity around the fitting bore, in which the tubing cavity interfaces with pipe segment tubing to facilitate fluidly coupling the fitting bore to a pipe bore defined by the pipe segment tubing. The fitting shell includes a seal groove that opens into the tubing cavity, in which the seal groove is recessed into a fitting shell surface that facilitates defining the tubing cavity. The pipe fitting includes a belt (e.g., flat) seal having a multisided axial cross-section profile, in which the belt seal is to be disposed in the seal groove to implement a fitting seal in the pipe fitting that includes a protruding portion having a wedge-shaped axial cross-section profile that protrudes beyond the fitting shell surface into the tubing cavity to facilitate sealing a fluid conduit implemented in an annulus of the pipe segment tubing in the tubing cavity of the pipe fitting.

In another embodiment, a method of implementing a pipeline system includes implementing a pipe fitting at least in part by implementing a fitting shell, in which implementing the fitting shell includes implementing a fitting body to define a fitting bore that enables fluid flow through the pipe fitting and coupling a fitting jacket to the fitting body to facilitate defining a tubing cavity to be used to interface with tubing of a pipe segment at which the pipe fitting is to be deployed/Additionally, the method includes implementing a seal groove in the fitting shell at least in part by removing material from a fitting shell surface that is adjacent to the tubing cavity to enable a wedged protrusion profile fitting seal that facilitates sealing the tubing of the pipe segment in the tubing cavity to be implemented in the pipe fitting at least in part by disposing a belt seal that has a multisided axial cross-section profile in the seal groove.

In another embodiment, a pipe fitting includes a fitting shell. The fitting shell includes a fitting tube that defines a fitting bore that enables fluid flow through the pipe fitting, a grab ring coupled around the fitting tube, in which the grab ring enables deployment equipment that operates to facilitate securing the pipe fitting to a pipe segment to be coupled to the pipe fitting, a fitting jacket coupled to the grab ring to facilitate defining a tubing cavity that interfaces with tubing of the pipe segment, and a seal groove that is adjacent to the tubing cavity and recessed into the fitting shell, in which the seal groove enables a wedged protrusion profile fitting seal that facilitates sealing the tubing of the pipe segment in the pipe fitting to be implemented in the pipe fitting at least in part by disposing a multisided belt seal in the seal groove.

DETAILED DESCRIPTION

Figure 1:
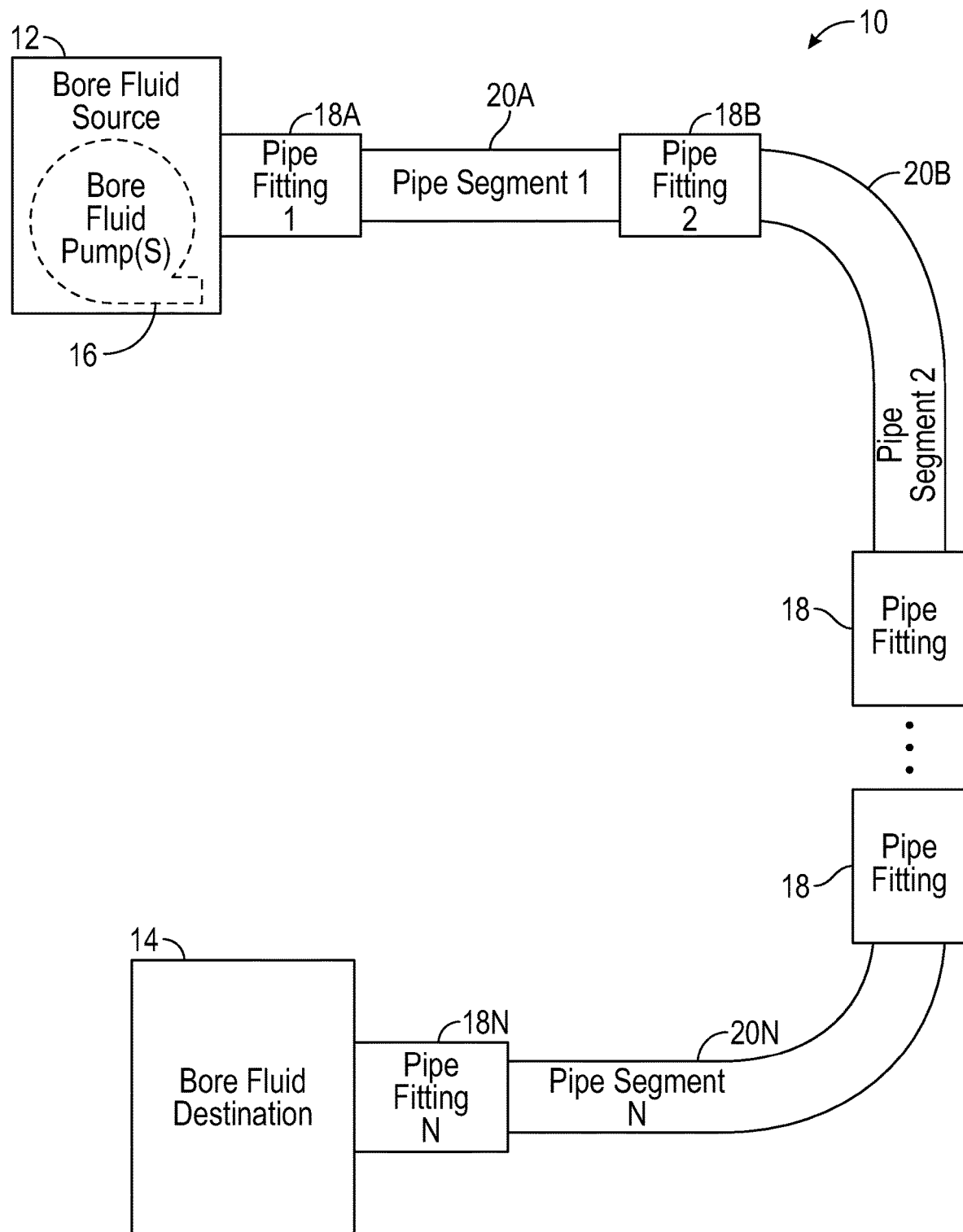
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting, which facilitates fluidly coupling the fluid source to a first pipe segment at least in part by securing and sealing tubing of the first pipe segment therein, a midline pipe fitting, which facilitates fluidly coupling the first pipe segment to a second pipe segment at least in part by securing and sealing the tubing of the first pipe segment as well as tubing of the second pipe segment therein, and a second pipe end fitting, which facilitates fluidly coupling the second pipe segment to the fluid destination at least in part by securing and sealing the tubing of the second pipe segment therein.

To facilitate securing a pipe segment in a pipe fitting, in some instances, a fitting shell of the pipe fitting may include a fitting body and a fitting jacket, which are implemented to define (e.g., enclose) a tubing cavity that is to be used to interface with tubing of the pipe segment. In particular, at least in some such instances, the tubing of the pipe segment may be secured in the tubing cavity using swaging techniques. More specifically, in such instances, the pipe fitting may be secured to the pipe segment at least in part by inserting (e.g., sliding) the tubing of the pipe segment into the tubing cavity and conformally deforming (e.g., swaging) the fitting jacket around the pipe segment tubing.

Additionally, to facilitate sealing pipe segment tubing therein, in some instances, a pipe fitting may include one or more fitting seals that at least partially protrude into a tubing cavity of the pipe fitting. Thus, when swaging techniques are used, a fitting seal that protrudes into the tubing cavity and pipe segment tubing present in the tubing cavity may be compressed against one another. In other words, a protruding surface of the fitting seal may engage (e.g., contact) a corresponding surface of the pipe segment tubing and, thus, facilitate blocking fluid from flowing past the fitting seal.

Generally, sealing integrity (e.g., ability to block fluid flow) provided by a fitting seal may be dependent at least in part on the surface area of the engagement between the fitting seal and pipe segment tubing. As such, to facilitate improving sealing integrity, in some instances, a belt (e.g., flat) seal that has a multisided (e.g., rectangular) axial cross-section profile may be used as a fitting seal, for example, instead of an O-ring seal that has a circular (e.g., single-sided) or a semicircular axial cross-section profile. However, in some instances, using a belt seal as a fitting seal that protrudes into a corresponding tubing cavity of a pipe fitting may potentially affect (e.g., reduce) sealing integrity and, thus, perceived quality of the pipe fitting, for example, due to pipe segment tubing being inserted into the tubing cavity inadvertently catching a protruding seal corner of the belt fitting seal, thereby resulting in continued insertion of the pipe segment tubing into the tubing cavity inadvertently (e.g., undesirably) displacing the belt fitting seal.

Accordingly, to facilitate improving perceived pipe fitting quality, the present disclosure provides techniques for implementing a pipe fitting with one or more partially protruding belt (e.g., flat) fitting seals, which have a reduced likelihood of being inadvertently (e.g., undesirably) displaced in a corresponding tubing cavity of the pipe fitting, for example, in an axial direction due to insertion of pipe segment tubing into the tubing cavity. In particular, to facilitate reducing the likelihood of inadvertent seal displacement, the present disclosure provides techniques for implementing (e.g., forming) a seal groove in the fitting shell (e.g., fitting body and/or fitting jacket) of the pipe fitting and implementing (e.g., disposing) a belt seal, which has a multisided (e.g., rectangular or pentagonal) axial cross-section profile, in the seal groove such that a protruding portion of a resulting fitting seal has a wedge-shaped axial cross-section profile. In other words, as will be described in more detail below, the present disclosure provides techniques that facilitate implementing a fitting seal with a protruding axial cross-section profile that includes a flush (e.g., first) seal corner, which is oriented toward a first (e.g., open) end of a corresponding tubing cavity, and a protruding (e.g., second) seal corner, which is oriented toward a second (e.g., closed and/or opposite) end of the tubing cavity.

To facilitate implementing a wedged protrusion profile fitting seal, in some embodiments, a seal groove of a pipe fitting may be implemented adjacent to a corresponding tubing cavity such that it opens into the tubing cavity and the axial cross-section profile of its groove base surface is at least partially slanted (e.g., angled at non-zero angle) relative to the axial (e.g., longitudinal) extent of the tubing cavity. In other words, in such embodiments, a first recessed groove corner of the slanted seal groove, which is oriented toward a first (e.g., open) end of the tubing cavity, may be recessed from an adjacent fitting shell surface a larger distance than a second recessed groove corner of the slanted seal groove, which is oriented toward a second (e.g., closed and/or opposite) end of the tubing cavity. Additionally, in some such embodiments, a belt seal to be disposed in the slanted seal groove may be implemented using an elastic material, such as rubber, and, thus, generally conform to the slanted seal groove when disposed therein.

In other words, in such embodiments, when a belt seal with a rectangular default (e.g., unstretched, undeformed, and/or original) axial cross-section profile is disposed therein, the slanted seal groove may cause a first seal corner of the rectangular belt seal, which is radially aligned with the first recessed groove corner of the slanted seal groove, to protrude out from the adjacent fitting shell surface a smaller distance compared to a second seal corner of the rectangular belt seal, which is radially aligned with the second recessed groove corner of slanted seal groove, thereby producing a slanted protruding seal surface between the first seal corner and the second seal corner and, thus, a wedged axial cross-section protrusion profile. To facilitate making the first seal corner flush with the adjacent fitting shell surface, in some embodiments, the first recessed groove corner of the slanted seal groove may be implemented with a first recess depth that matches the belt seal thickness expected to occur when the rectangular belt fitting seal is disposed therein, for example, while the second recessed groove corner of the slanted seal groove is implemented with a second (e.g., different) recess depth that is less than the expected (e.g., stretched) belt seal thickness. In other embodiments, a rectangular belt seal to be disposed in the slanted seal groove may be selected and/or designed such that its expected thickness when disposed in the slanted seal groove matches the first recess depth of the first recessed groove corner.

Additionally or alternatively, to facilitate implementing a wedged protrusion profile fitting seal, in some embodiments, a seal groove of a pipe fitting may be implemented adjacent to a corresponding tubing cavity such that it opens into the tubing cavity and has a substantially (e.g., relatively) quadrilateral-shaped (e.g., rectangular-shaped) axial cross-section profile, for example, which includes a groove base surface that is not slanted relative to the axial (e.g., longitudinal) extent of the tubing cavity. In other words, in such embodiments, a first recessed groove corner of the quadrilateral (e.g., rectangular) seal groove, which is oriented toward a first (e.g., open) end of the tubing cavity, and a second recessed corner of the quadrilateral seal groove, which is oriented toward a second (e.g., closed and/or opposite) end of the tubing cavity, may both be recessed from an adjacent fitting shell the same distance. Additionally, in some such embodiments, a belt seal to be disposed in the quadrilateral seal groove may be implemented using an elastic material, such as rubber, and, thus, generally conform to the quadrilateral seal groove when disposed therein.

In other words, in such embodiments, when a belt seal with a wedged default (e.g., unstretched, undeformed, and/or original) axial cross-section profile is disposed therein, the quadrilateral seal groove may cause a first seal corner of the wedged belt seal, which is radially aligned with the first recessed groove corner of the slanted seal groove, to protrude out from the adjacent fitting shell surface a smaller distance compared to a second seal corner of the rectangular belt seal, which is radially aligned with the second recessed groove corner of quadrilateral seal groove, thereby producing a slanted protruding seal surface between the first seal corner and the second seal corner and, thus, a wedged axial cross-section protrusion profile. To facilitate making the first seal corner flush with the adjacent fitting shell surface, in some embodiments, the quadrilateral seal groove may be implemented with a recess depth that matches the belt seal thickness expected to occur at the first seal corner of the wedged belt seal when the wedged belt fitting seal is disposed therein. In other embodiments, a wedged belt seal to be disposed in the quadrilateral seal groove may be selected and/or designed such that the expected thickness at its first seal corner when disposed in the quadrilateral seal groove matches the recess depth of the quadrilateral seal groove.

In this manner, the techniques described in the present disclosure may facilitate implementing a belt fitting seal with a wedged axial cross-section protrusion profile in a pipe fitting. As will be described in more detail below, implementing a belt fitting seal with a wedged axial cross-section protrusion profile may facilitate reducing the likelihood of the belt fitting seal being inadvertently displaced from (e.g., rolled out of) its seal groove, for example, due at least in part to a seal corner of the belt fitting seal, which is oriented toward an open end of a corresponding tubing cavity, being flush with an adjacent surface of the tubing cavity, thereby reducing the likelihood of pipe segment tubing being inserted into the tubing cavity catching on the seal corner. Since sealing integrity is generally dependent on the surface area of engagement between a (e.g., wedged protrusion profile) fitting seal and pipe segment tubing, at least in some instances, reducing the likelihood of the fitting sealing being inadvertently displaced in accordance with the techniques of the present disclosure may facilitate improving sealing integrity provided by the fitting seal and, thus, potentially perceived quality of a corresponding pipe fitting.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in the pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
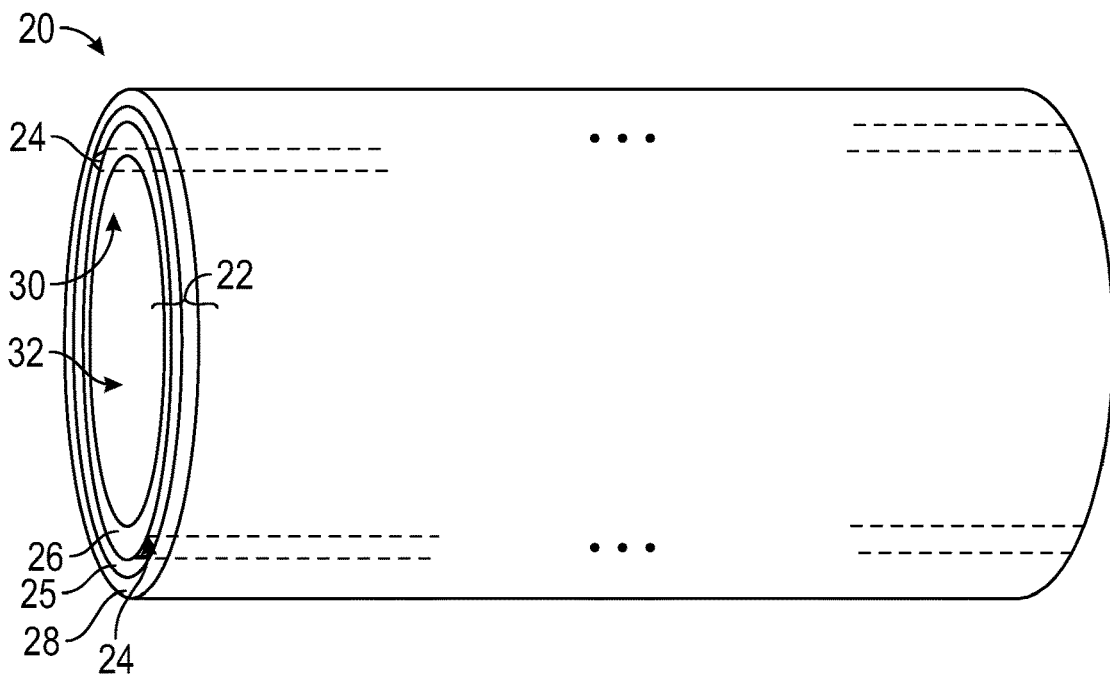
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to a solid pipe segment tubing 22 and/or pipe segment tubing 22 that does not include fluid conduits 24 implemented therein. Moreover, to facilitate further improving flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
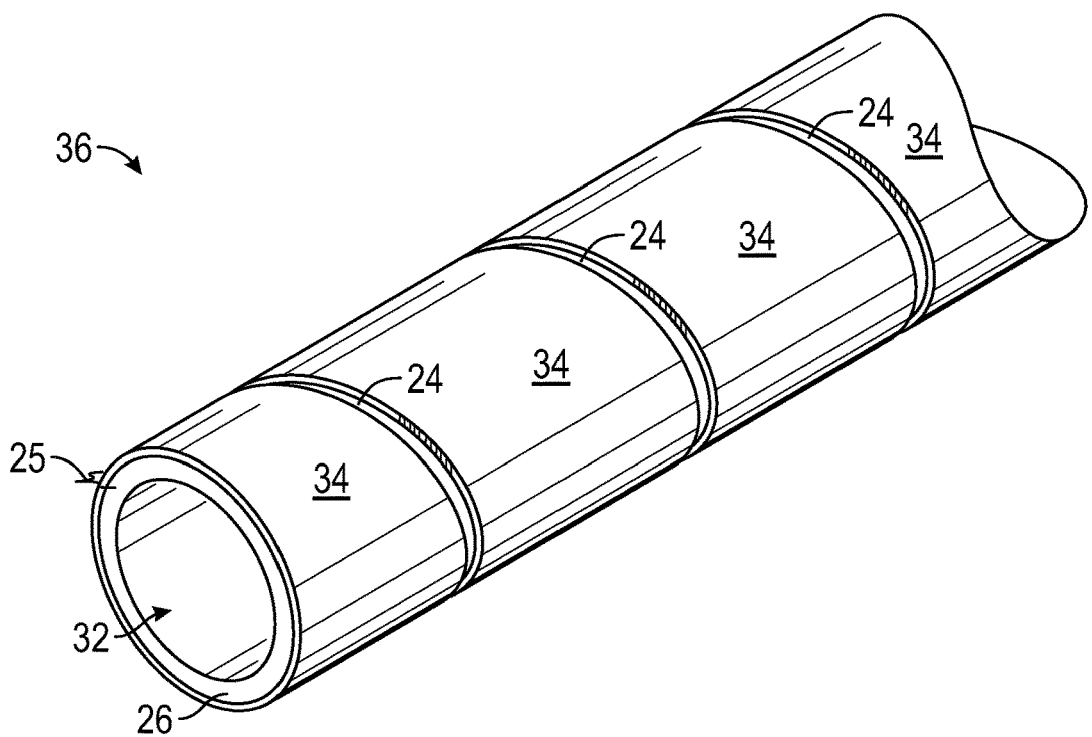
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, a pipe segment 20 may be secured and sealed in one or more pipe fittings 18, such as a midline pipe fitting 18 and/or a pipe end fitting 18. In particular, as described above, in some instances, a pipe fitting 18 may be secured to a pipe segment 20 using swaging techniques, for example, which conformally deform the pipe fitting 18 around tubing 22 of the pipe segment 20. In fact, in some embodiments, deployment equipment, such as a swage machine, may be implemented and/or operated to facilitate securing a pipe fitting 18 to a pipe segment 20 during deployment of a pipeline system 10.

Figure 4:
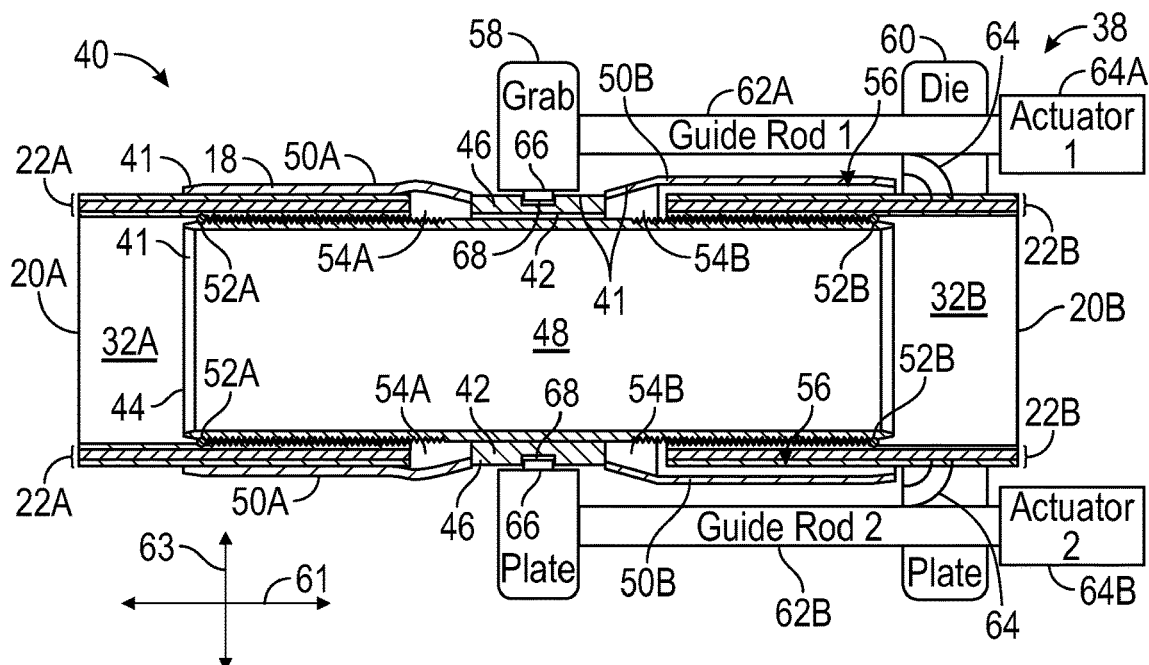
FIG. 4 is an axial cross-sectional view of an example of deployment equipment coupled to a pipe fitting and pipe segments of FIG. 1, in accordance with an embodiment of the present disclosure.

To help illustrate, an example cross-section of deployment equipment 38 and a portion 40 of a pipeline system 10 is shown in FIG. 4. As depicted, the portion 40 of the pipeline system 10 includes a first pipe segment 20A, a second pipe segment 20B, and a pipe fitting 18, which is coupled between the first pipe segment 20A and the second pipe segment 20B. Additionally, as depicted, a fitting shell 41 of the pipe fitting 18 includes fitting jackets 50—namely a first fitting jacket 50A and a second fitting jacket 50B—and a fitting body 42, which includes a fitting tube 44 and a grab ring 46 that is implemented around the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, as will be described in more detail below, the techniques described in the present disclosure may additionally or alternatively be used with a pipe end fitting 18.

In any case, as depicted, in addition to the fitting shell 41, the pipe fitting 18 includes fitting seals 52—namely a first fitting seal 52A and a second fitting seal 52B—implemented circumferentially around the fitting tube 44. In particular, as depicted, first tubing 22A of the first pipe segment 20A is disposed in a first tubing cavity 54A, which is defined between the first fitting jacket 50A and the fitting body 42. Similarly, second tubing 22B of the second pipe segment 20B is disposed in a second tubing cavity 54B, which is defined between the second fitting jacket 50B and the fitting body 42.

However, as depicted, open space 56 is present between the second tubing 22B of the second pipe segment 20B and the pipe fitting 18 whereas minimal open space is present between the first tubing 22A of the first pipe segment 20A and the pipe fitting 18. In other words, the pipe fitting 18 may exert more resistance to tubing movement in the first tubing cavity 54A and, thus, facilitate securing the pipe fitting 18 to the first pipe segment 20A, for example, in addition to sealing the first tubing 22A in the first tubing cavity 54A via the first fitting seal 52A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 52B of the pipe fitting 18. As such, to facilitate securing and sealing the second pipe segment 20B in the pipe fitting 18, the deployment equipment 38 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as in the depicted example, the deployment equipment 38 may include a grab plate 58, a die plate 60, one or more guide rods 62, and one or more actuators 64. More specifically, in the depicted example, the deployment equipment 38 includes a first actuator 64A, which is coupled to the grab plate 58 via a first guide rod 62A that extends through the die plate 60. Additionally, the deployment equipment 38 includes a second actuator 64B, which is coupled to the grab plate 58 via a second guide rod 62B that extends through the die plate 60. As such, in some embodiments, the first actuator 64A and/or the second actuator 64B may be operated (e.g., controlled) to selectively push the die plate 60 toward the grab plate 58 and/or to selectively pull the die plate 60 away from the grab plate 58.

Furthermore, as depicted, a die (e.g., one or more die segments or die halves) 64 is disposed in the die plate 60. When compressed against a fitting jacket 50 in the axial direction 61, the shape of the die 64 may compress the fitting jacket 50 inwardly in a radial direction 63, for example, such that the fitting jacket 50 and pipe segment tubing 22 disposed in a corresponding tubing cavity 54 are conformally deformed and/or such that the pipe segment tubing 22 and a fitting seal 52 in the tubing cavity 54 are compressed against each other. In fact, in some embodiments, different dies 64 may be selectively used in the die plate 60, for example, during successive compression cycles and/or depending on characteristics, such as diameter and/or material thickness, of the fitting jacket 50.

To facilitate compressing the die plate 60 and, thus, its die 64 against a fitting jacket 50, as in the depicted example, the grab plate 58 of the deployment equipment 38 may be secured to the pipe fitting 18 via one or more equipment grab tabs 66. In particular, as in the depicted example, an equipment grab tab 66 on the deployment equipment 38 may be implemented (e.g., sized and/or shaped) to matingly interlock (e.g., interface and/or engage) with a corresponding grab notch 68 on the grab ring 46 of the pipe fitting 18 and, thus, facilitate securing the deployment equipment 38 to the pipe fitting 18. As described above, the deployment equipment 38 may then force (e.g., push and/or compress) its die plate 60 and, thus, its die 64 toward its grab plate 58, which, at least in some instances, may conformally deform the second fitting jacket 50B of the pipe fitting 18 and the second tubing 22B of the second pipe segment 20B and, thus, facilitate securing the pipe fitting 18 to the second pipe segment 20B, for example, in addition to sealing the second tubing 22B in the second tubing cavity 54B via the second fitting seal 52B. In this manner, deployment equipment 38 may be implemented and/or operated to facilitate deploying a pipe fitting 18 at a pipe segment 20.

Figure 5:
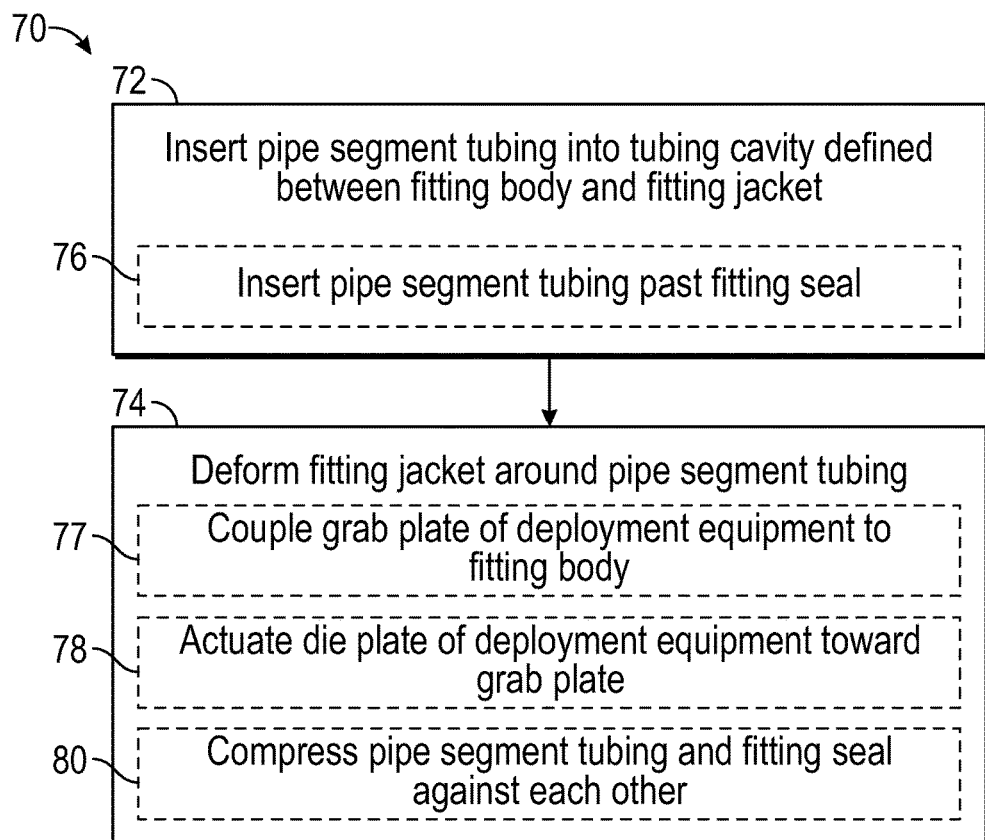
FIG. 5 is a flow diagram of an example of a process for deploying a pipe fitting at a pipe segment, in accordance with an embodiment of the present disclosure.

To help further illustrate, an example of a process 70 for deploying a pipe fitting 18 at a pipe segment 20 is described in FIG. 5. Generally, the process 70 includes inserting pipe segment tubing into a tubing cavity defined between a fitting body and a fitting jacket (process block 72) and deforming the fitting jacket around the pipe segment tubing (process block 74). Although described in a specific order, which corresponds with an embodiment of the present disclosure, it should be appreciated that the example process 70 is merely intended to be illustrative and non-limiting. In particular, in other embodiments, a process 70 for deploying a pipe fitting 18 may include one or more additional process blocks and/or omit one or more of the depicted process blocks.

In any case, as described above, a pipe fitting 18 may include a tubing cavity 54, which is implemented to interface with the tubing 22 of a pipe segment 20 at which the pipe fitting 18 is to be deployed. In particular, as described above, the tubing cavity 54 may be defined (e.g., enclosed) between a fitting body 42 and a corresponding fitting jacket 50 of the pipe fitting 18. For example, in some embodiments, the tubing cavity 54 may be defined between an inner surface of the fitting jacket 50 and an outer surface of a fitting tube 44 of the fitting body 42. Thus, in such embodiments, the pipe fitting 18 may be deployed at least in part by inserting the tubing 22 of the pipe segment 20 into a tubing cavity 54 of the pipe fitting 18 (process block 72).

Additionally, as described above, in some embodiments, one or more fitting seals 52 may protrude into a tubing cavity 54 of a pipe fitting 18 to facilitate sealing pipe segment tubing 22 therein. For example, a fitting seal 52 may protrude from an outer surface of the fitting tube 44 or an inner surface of the fitting jacket 50. Moreover, in some such embodiments, a fitting seal 52 may be implemented proximate to an open end of the tubing cavity 54, for example, such that the fitting seal 52 is closer to the open end of the tubing cavity 54 than a closed (e.g., opposite) end of the tubing cavity 54. In other words, in such embodiments, inserting the pipe segment tubing 22 into the tubing cavity 54 may include inserting the pipe segment tubing 22 past one or more fitting seals that at least partially protrude into the tubing cavity 54 (process block 76).

Furthermore, as described above, in some embodiments, a pipe fitting 18 may be secured to a pipe segment 20 using swaging techniques. In particular, as described above, in such embodiments, swaging techniques may be used to conformally deform a fitting jacket 50 of the pipe fitting 18 around the tubing 22 of the pipe segment 20. In other words, in such embodiments, the pipe fitting 18 may be deployed at least in part by deforming the fitting jacket 50 around the tubing 22 of the pipe segment 20 (process block 74).

Moreover, as described above, in some embodiments, deployment equipment 38, such as a swage machine, may be used to facilitate deploying a pipe fitting 18 at a pipe segment 20. In particular, as described above, in some such embodiments, the deployment equipment 38 may include a grab tab 66 on its grab plate 58, which is implemented (e.g., shaped and/or sized) to mating interface with a corresponding grab notch 68 on a grab ring 46 of a fitting body 42. Additionally, as described above, in some such embodiments, the deployment equipment 38 may include a die plate 60 with a die 64, which, when compressed against a fitting jacket 50 in an axial direction 61, may compress the fitting jacket inwardly in a radial direction 63. In other words, in some embodiments, deforming the fitting jacket 50 around the pipe segment tubing 22 may include coupling the grab plate 58 of the deployment equipment 38 to the fitting body 42 of the pipe fitting 18 (process block 77) and actuating the die plate 60 of the deployment equipment 38 toward the grab plate 58 (process block 78).

Furthermore, as described above, in some embodiments, a pipe fitting 18 may include one or more fitting seals 52 that at least partially protrude into the tubing cavity 54. For example, a fitting seal 52 may protrude from an outer surface of the fitting tube 44 or an inner surface of the fitting jacket 50. In other words, in such embodiments, deforming the fitting jacket around the pipe segment tubing 22 may include compressing the pipe segment tubing 22 and one or more fitting seals 52 in the tubing cavity 54 against each other (process block 80).

As described above, to facilitate increasing the engagement surface area between a fitting seal 52 in a pipe fitting 18 and tubing 22 of a pipe segment 20, in some embodiments, a belt (e.g., flat) seal that has a multisided (e.g., rectangular or pentagonal) axial cross-section profile may be used as the fitting seal 52, for example, instead of an O-ring seal that has a circular (e.g., single-sided) or a semicircular axial cross-section profile. However, as described above, in some instances, using a belt seal as a fitting seal 52 in a pipe fitting 18 may result in multiple seal corners of the fitting seal 52 protruding beyond an adjacent fitting shell surface of the pipe fitting 18. Moreover, as described above, a protruding seal corner of a fitting seal 52 in a pipe fitting 18 may result in the fitting seal 52 being inadvertently displaced from its target location in a corresponding tubing cavity 52 due to movement of pipe segment tubing 22 in the tubing cavity 52, which, at least in some instances, may affect (e.g., reduce) its subsequent engagement surface area and, thus, its subsequent sealing integrity and potentially perceived quality of the pipe fitting 18. For example, during insertion into the tubing cavity 54, pipe segment tubing 22 may catch on a protruding seal corner of the fitting seal 52 that is oriented toward an open end of the tubing cavity 54 and, thus, continuing with the insertion may inadvertently roll at least a portion of the fitting seal 52 out from a corresponding seal cavity.

Accordingly, to facilitate improving sealing integrity and/or perceived pipe fitting quality, the present disclosure provides techniques for implementing a pipe fitting 18 with one or more partially protruding fitting seals 52, which have a reduced likelihood of being inadvertently (e.g., undesirably) displaced in a corresponding tubing cavity 54 of the pipe fitting 18. To facilitate reducing the likelihood of inadvertent seal displacement, in some embodiments, a fitting seal 52 may be implemented with a wedged axial cross-section protrusion profile, for example, which is oriented toward an open end of the tubing cavity 54. In this manner, as will be described in more detail below, the techniques described in the present disclosure may facilitate reducing the likelihood of pipe segment tubing 22 in the tubing cavity 54 inadvertently catching on and, thus, inadvertently displacing the wedged protrusion profile fitting seal 52 in the tubing cavity 54, for example, during insertion of the pipe segment tubing 22 into the tubing cavity 54.

Figure 6:
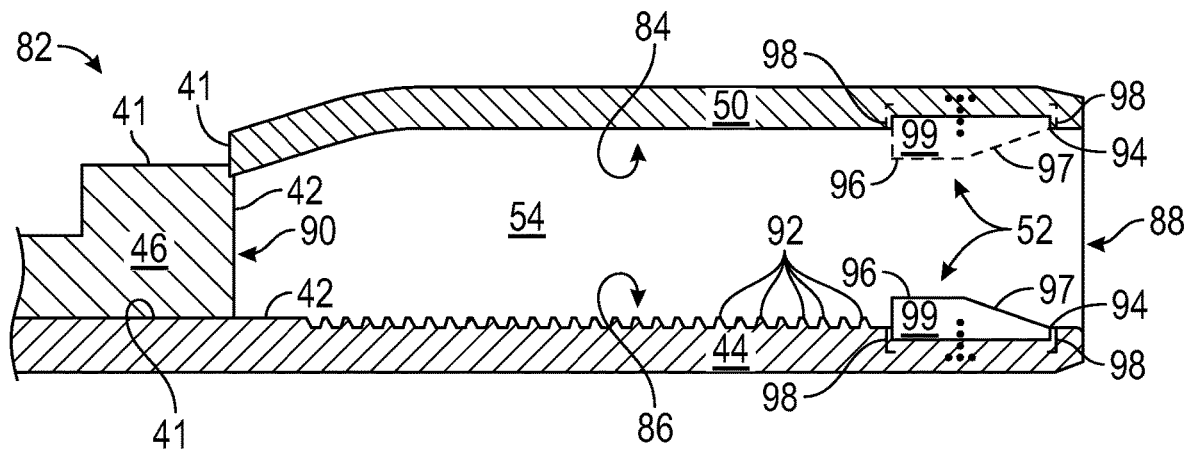
FIG. 6 is an axial cross-sectional view of an example of a portion of a pipe fitting that includes one or more wedged protrusion profile fitting seals, in accordance with an embodiment of the present disclosure.

To help illustrate, an example cross-section of a portion 82 of a pipe fitting 18, which includes one or more wedged protrusion profile fitting seals 52, is shown in FIG. 6. As will be described in more detail below, in some embodiments, the depicted portion 82 may be included in a midline pipe fitting 18. In other embodiments, the depicted portion 82 may be included in a pipe end fitting 18.

In any case, as depicted, the portion 82 of the pipe fitting 18 includes a portion of its fitting body 42—namely a portion of a grab ring 46 and a portion of a fitting tube 44—and a fitting jacket 50 of its fitting shell 41. In particular, as depicted, the fitting shell 41 is implemented to define (e.g., enclose) a tubing cavity 54, for example, such that the tubing cavity 54 spans from an inner surface 84 of the fitting jacket 50 to an outer surface 86 of the fitting tube 44. As described above, a tubing cavity 54 of a pipe fitting 18 may be implemented to interface with the tubing 22 of a pipe segment 20, for example, such that the pipe segment tubing 22 is secured and sealed in the tubing cavity 54.

Additionally, as described above, to facilitate securing pipe segment tubing 22 in a tubing cavity 54 defined within a fitting shell 41, in some embodiments, swaging techniques may be used to conformally deform at least portion a portion of the fitting shell 41 around the pipe segment tubing 22. For example, as described above, the pipe segment tubing 22 may be inserted from an open end 88 of the tubing cavity 54 toward a closed end 90 of the tubing cavity 54 and deployment equipment 38, such as a swage machine, may operate to compress the fitting jacket 50 inwardly such that the fitting jacket 50 is conformally deformed around the pipe segment tubing 22 in the tubing cavity 54. To facilitate improving security strength, as in the depicted example, in some embodiments, one or more teeth (e.g., serrations) 92 may be implemented on the outer surface 86 of the fitting tube 44, for example, such that the one or more teeth 92 run circumferentially along the outer surface 86.

However, it should be appreciated that the depicted example is merely intended to be illustrative and not limiting. In particular, in other embodiments, the fitting shell 41 may not include teeth 92 implemented on an outer surface 86 of its fitting tube 44. Additionally or alternatively, in other embodiments, the fitting shell 41 may include one or more teeth (e.g., serrations) 92 implemented on an inner surface 84 of one or more of its fitting jackets 50.

In any case, as depicted, the wedged protrusion profile fitting seal 52 includes a flush seal corner 94, which is oriented toward the open end 88 of the tubing cavity 54 and substantially (e.g., relatively) flush with an adjacent surface of the fitting shell 41. Additionally, as depicted, the wedge protrusion profile fitting seal 52 includes a protruding seal corner 96, which is oriented toward the closed end of the tubing cavity 54 and protrudes from an adjacent surface of the fitting shell 41, for example, by one or more orders of magnitude more than the flush seal corner 94. Furthermore, as depicted, the wedge protrusion profile fitting seal 52 includes a slanted protruding seal surface 97, which is connected between the flush seal corner 94 and the protruding seal corner 96 as well as being oriented toward the open end 88 of the tubing cavity 54. Thus, at least in some instances, implementing the wedge protrusion profile fitting seal 52 in this manner may facilitate reducing the likelihood of the wedge protrusion profile fitting seal 52 inadvertently being displaced, for example, due to pipe segment tubing 22 being inserted into the tubing cavity 54 sliding along the slanted protruding seal surface 97 instead of catching on a seal corner of the wedge protrusion profile fitting seal 52.

However, it should again be appreciated that the depicted example is merely intended to be illustrative and not limiting. For example, in some embodiments, a pipe fitting 18 may additionally or alternatively include a (e.g., second) wedged protrusion profile fitting seal 52 that protrudes from the inner surface 84 of a fitting jacket 50. Furthermore, in other embodiments, the slanted protruding seal surface 97 of one or more wedge protrusion profile fitting seals 52, which protrude into a tubing cavity 54, may be oriented toward the closed end 90 of the tubing cavity 54. Additionally or alternatively in other embodiments, one or more wedged protrusion profile fitting seals 52 may be implemented proximate to the closed end 90 of a corresponding tubing cavity 54, for example, instead of proximate to its open end 88 as in the example depicted in FIG. 6.

In any case, to facilitate further reducing the likelihood of inadvertent seal displacement, as described above, a wedge protrusion profile fitting seal 52 may be partially recessed into a corresponding fitting shell 41. In particular, as depicted, the wedged protrusion profile fitting seal 52 includes a belt (e.g., flat) seal 99, which has a multisided axial cross-section profile, implemented in a seal groove 98, which is recessed into the fitting shell 41 of the pipe fitting 18 and opens into the tubing cavity 54. When implemented in this manner, as in the depicted example, a first (e.g., recessed) portion of the wedged protrusion profile fitting seal 52 may lie within the seal groove 98 while a second (e.g., protruding) portion of the wedged protrusion profile fitting seal 52 extends out of the seal groove 98.

Figure 7:
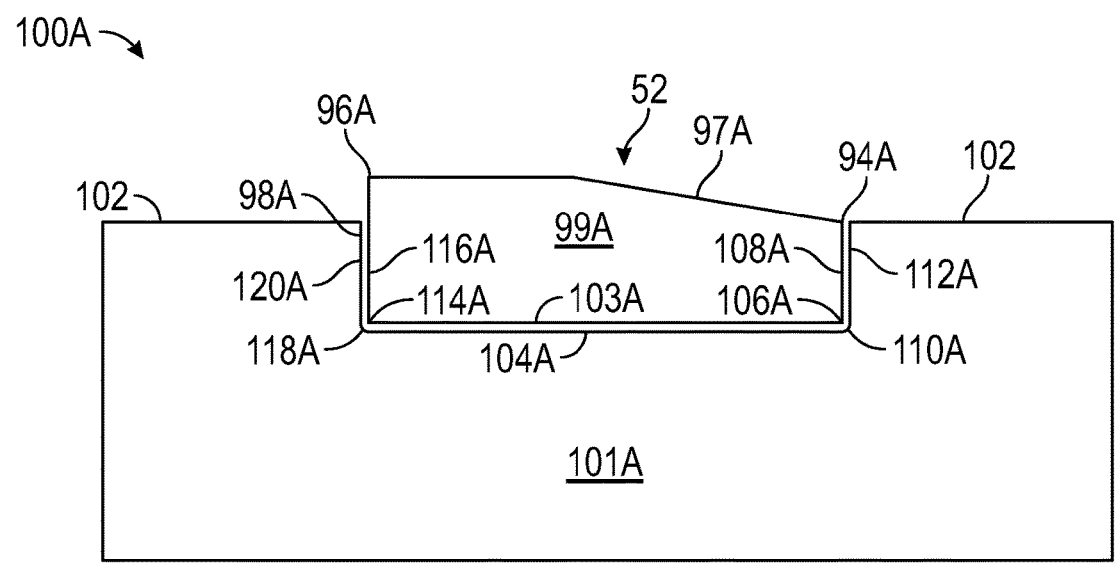
FIG. 7 is an axial cross-sectional view of an example of a wedged protrusion profile fitting seal of FIG. 6, which is implemented using a seal groove that has a quadrilateral-shaped (e.g., rectangular-shaped) axial cross-section profile and a belt (e.g., flat) seal that has a wedge-shaped axial cross-section profile, in accordance with an embodiment of the present disclosure.

To help illustrate, an example cross-section of a portion 100A of a pipe fitting 18, which includes a portion 101A of its fitting shell 41 and a wedged protrusion profile fitting seal 52, is shown in FIG. 7. As depicted, the fitting shell portion 101A includes a seal groove 98A, which is recessed from a fitting shell surface 102. In particular, as depicted, the seal groove 98A includes a groove base surface 104A that is parallel (e.g., concentric) with the fitting shell surface 102 and has a quadrilateral-shaped (e.g., rectangular-shaped) axial cross-section profile. In other words, the seal groove 98A of FIG. 7 is a quadrilateral (e.g., rectangular) seal groove 98A.

In some embodiments, the depicted fitting shell portion 101A may be included in a fitting tube 44 of the pipe fitting 18. In other words, in such embodiments, the fitting shell surface 102 may be an outer surface 86 of the fitting tube 44. Additionally or alternatively, in some embodiments, the depicted fitting shell portion 101A may be included in a fitting jacket 50 of the pipe fitting 18. In other words, in such embodiments, the fitting shell surface 102 may be an inner surface 84 of the fitting jacket 50. Moreover, as will be described in more detail below, in some embodiments, the depicted portion 100A of the pipe fitting 18 may be included in a midline pipe fitting 18 while, in other embodiments, the depicted portion 100A of the pipe fitting 18 may be included in a pipe end fitting 18.

In any case, as depicted in FIG. 7, a belt (e.g., flat) seal 99A is disposed in the quadrilateral seal groove 98A to facilitate implementing the wedged protrusion profile fitting seal 52. As depicted, when disposed the belt seal 99A is disposed in the quadrilateral seal groove 98A, the wedged protrusion profile fitting seal 52 includes a flush seal corner 94A, which is substantially (e.g., relatively) flush with the fitting shell surface 102, and a protruding seal corner 96A, which protrudes beyond the fitting shell surface 102, for example, by one or more orders of magnitude more than the flush seal corner 94A. Additionally, as depicted, the wedged protrusion profile fitting seal 52 includes a slanted protruding seal surface 97A, which is connected between the flush seal corner 94A and the protruding seal corner 96A. In other words, as depicted, when the belt seal 99A is disposed in the quadrilateral seal groove 98A, a resulting fitting seal 52 has a wedge-shaped axial cross-section profile and, thus, is a wedged protrusion profile fitting seal 52.

In some embodiments, a belt seal 99 used in a wedged protrusion profile fitting seal 52 may be implemented using elastic material, such as rubber. Thus, in such embodiments, a recessed portion of the wedged protrusion profile fitting seal 52 may generally conform with a corresponding seal groove 98 in which the is belt seal 99 is disposed. For example, as depicted in FIG. 7, a seal base surface 103A of the wedged protrusion profile fitting seal 52 generally conforms with a groove base surface 104A of the quadrilateral seal groove 98A. Additionally, as depicted, a first seal side surface 108A of the wedged protrusion profile fitting seal 52, which is connected to between the flush seal corner 94A and a first recessed seal corner 106A, generally confirms with a first groove side surface 112A of the quadrilateral seal groove 98A such that the first recessed seal corner 106A is disposed in a first recessed groove corner 110A of the quadrilateral seal groove 98A. Furthermore, as depicted, a recessed portion of a second seal side surface 116A, which is connected to between the protruding seal corner 96A and a second recessed seal corner 114A of the wedged protrusion profile fitting seal 52, generally conforms with a second groove side surface 120A of the quadrilateral seal groove 98A such that the second recessed seal corner 114A is disposed in a second recessed groove corner 118A of the quadrilateral seal groove 98A.

In fact, when implemented using elastic material, in some embodiments, the elasticity of a belt seal 99 may be leveraged to facilitate securing the belt seal 99 in a corresponding seal groove 98. For example, in some such embodiments, a default (e.g., unstretched, unstrained, and/or original) circumference of the seal base surface 103 of the belt seal 99 may be less than the circumference of the groove base surface 104 of a corresponding seal groove 98 that is implemented along an outer surface 86 of a fitting tube 44. Accordingly, in such embodiments, the belt seal 99 may be disposed in the seal groove 98 at least in part by stretching (e.g., expanding) the belt seal 99 from its default circumference to fit the seal groove 98, thereby enabling the desire of the belt seal 99 to return to its default circumference to be used to facilitate securing the belt seal 99 in the seal groove 98. In other words, when disposed in the seal groove 98, the thickness of the belt seal 99 may be reduced from its default (e.g., unstretched, unstrained, and/or original) thickness.

As will be described in more detail below, in some embodiments, conformation (e.g., stretching) of a belt seal 99 to a corresponding seal groove 98 may change the general shape of its axial cross-section profile, for example, from a rectangular-shaped axial cross-section profile to a hexagonal-shaped axial cross-section profile. However, although thickness of the belt seal 99A in FIG. 7 may be reduced from its default thickness, in some embodiments, the general shape of its axial cross-section profile once disposed in the quadrilateral seal groove 98A may match the general shape of its default axial cross-section profile, for example, due at least in part to the uniform recess depth of the quadrilateral seal groove 98A. In other words, in such embodiments, the default axial cross-section profile of the belt seal 99A may be wedge shaped and, thus, the belt seal 99A of FIG. 7 may be a wedged belt seal 99A.

In any case, to facilitate implementing the flush seal corner 94A, as depicted, the recess depth of the first recessed groove corner 110A (e.g., length of first groove side surface 112A) generally matches the thickness of the wedged protrusion profile fitting seal 52 at the flush seal corner 94A (e.g., length of first seal side surface 108A), for example, while the recess depth of the second groove corner 118A (e.g., length of second groove side surface 120A) also matches the thickness of the wedged protrusion profile fitting seal 52 at the flush seal corner 94A. However, as described above, in some embodiments, the belt seal 99A used in the wedged protrusion profile fitting seal 52 may be implemented using elastic material and, thus, the thickness of the wedged protrusion profile fitting seal 52 may differ from (e.g., be less than) the default thickness of the belt seal 99A. Thus, to facilitate implementing the flush seal corner 94A, in some such embodiments, the recess depth of the first recessed groove corner 110A may implemented to match an expected (e.g., stretched) thickness of the wedged protrusion profile fitting seal 52 that is expected to occur at the flush seal corner 94A when the belt seal 99A is disposed in the quadrilateral seal groove 98A. In other such embodiments, a belt seal 99A to be disposed in the quadrilateral seal groove 98A may be selected and/or designed such that the expected thickness at the flush seal corner 94A when disposed in the quadrilateral seal groove 98A matches the recess depth of the quadrilateral seal groove 98A.

In any case, as described above, in some embodiments, the flush seal corner 94A of the wedged protrusion profile fitting seal 52 may be oriented toward the open end 88 of the tubing cavity 54 while the protruding seal corner 96A of the wedged protrusion profile fitting seal 52 may be oriented toward the closed end 90 of the tubing cavity 54. In other words, in such embodiments, the slanted protruding seal surface 97A, which is connected between the flush seal corner 94A and the protruding seal corner 96A, may be oriented toward the open end 88 of the tubing cavity 54. As such, implementing the wedged protrusion profile fitting seal 52 (e.g., belt seal 99A and quadrilateral seal groove 98A) in this manner may facilitate reducing the likelihood of pipe segment tubing 22 inadvertently catching on the wedged protrusion profile fitting seal 52 while being inserted into the tubing cavity 54, for example, due to the pipe segment tubing 22 instead sliding along the slanted protruding seal surface 97A of the wedged protrusion profile fitting seal 52. In other words, implementing a pipe fitting 18 in this manner may facilitate reducing the likelihood of a (e.g., wedged protrusion profile) fitting seal 52 inadvertently being displaced (e.g., rolled out) from a corresponding seal groove 98, which, at least in some instances, may facilitate improving sealing integrity and, thus, potentially perceived quality of the pipe fitting 18.

However, it should be appreciated that the depicted example is merely intended to be illustrative and not limiting. In particular, in other embodiments, a seal groove 98 and/or a corresponding belt seal 99 may be implemented with an axial cross-section profile that differs from the examples depicted in FIG. 7. For example, in other embodiments, the seal groove 98 may be implemented with a non-quadrilateral axial cross-section profile and the belt seal 99 may be implemented with a quadrilateral-shaped (e.g., rectangular-shaped) default axial cross-section profile.

Figure 8:
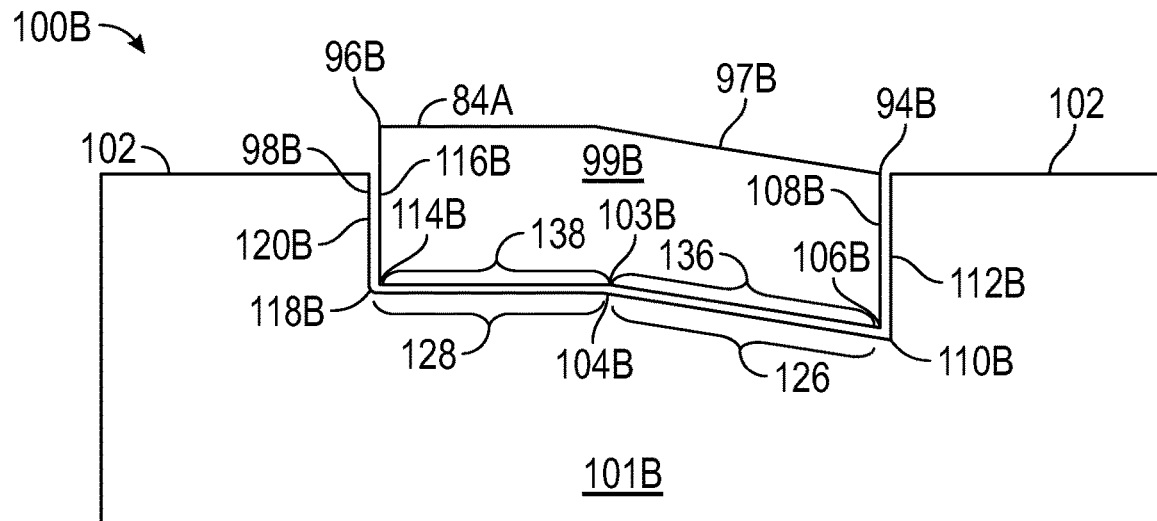
FIG. 8 in an axial cross-sectional view of another example of a wedge protrusion profile fitting seal of FIG. 6, which is implemented using a seal groove that has an at least partially slanted axial cross-section profile and a belt (e.g., flat) seal that has a quadrilateral default axial cross-section profile, in accordance with an embodiment of the present disclosure.

To help illustrate, another example cross-section of a portion 100B of a pipe fitting 18, which includes a portion 101B of its fitting shell 41 and a wedged protrusion profile fitting seal 52, is shown in FIG. 8. As depicted, the fitting shell portion 101B includes a seal groove 98B, which is recessed from a fitting shell surface 102. In particular, as depicted, a groove base surface 104B of the seal groove 98B includes a first portion 126, which is slanted (e.g., angled at non-zero angle) relative to the fitting shell surface 102, and a second portion 128, which is parallel (e.g., concentric) with the fitting shell surface 102. In other words, the seal groove 98B of FIG. 8 is a slanted (e.g., pentagonal) seal groove 98B.

In some embodiments, the depicted fitting shell portion 101B may be included in a fitting tube 44 of the pipe fitting 18. In other words, in such embodiments, the fitting shell surface 102 may be an outer surface 86 of the fitting tube 44. Additionally or alternatively, in some embodiments, the depicted fitting shell portion 101B may be included in a fitting jacket 50 of the pipe fitting 18. In other words, in such embodiments, the fitting shell surface 102 may be an inner surface 84 of the fitting jacket 50. Moreover, in some embodiments, the depicted portion 100B of the pipe fitting 18 may be included in a midline pipe fitting 18 while, in other embodiments, the depicted portion 100B of the pipe fitting 18 may be included in a pipe end fitting 18.

Figure 9:
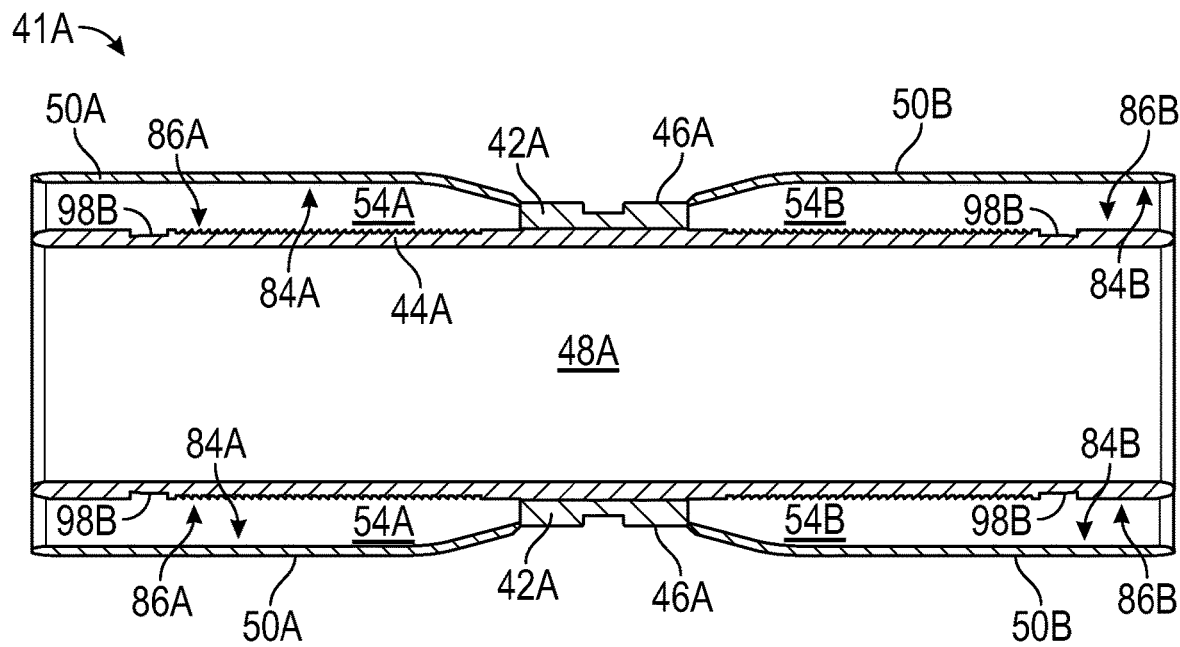
FIG. 9 is an axial cross-sectional view of an example of a fitting shell that includes the seal groove of FIG. 8, in accordance with an embodiment of the present disclosure.

To help illustrate, an example cross-section of a midline pipe fitting shell 41A, which includes slanted seal grooves 98B, is shown in FIG. 9. As depicted, the midline pipe fitting shell 41A includes fitting jackets 50—namely a first fitting jacket 50A and a second fitting jacket 50B—and a fitting body 42A. Additionally, as depicted, the fitting body 42A includes a fitting tube 44A, which defines a fitting bore 48A, and a grab ring 46A, which is implemented around the fitting tube 44A.

In some embodiments, the grab ring 46A of FIG. 9 may generally match the grab ring 46 of FIG. 4. Additionally, in some embodiments, the fitting jackets 50 of FIG. 9 may generally match the fitting jackets 50 of FIG. 4. In other words, similar to FIG. 4, the first fitting jacket 50A of FIG. 9 is implemented to facilitate defining (e.g., enclosing) a first tubing cavity 54A while the second fitting jacket 50B of FIG. 9 is implemented to facilitate defining a second tubing cavity 54B. However, while the first fitting jacket 50A of FIG. 4 is in a deformed state, as depicted, the first fitting jacket 50A of FIG. 9 is in an undeformed state, for example, to enable pipe segment tubing 22 to be inserted into the first tubing cavity 54A.

Furthermore, as in the depicted example, multiple slanted seal grooves 98B may be implementing along corresponding fitting shell surfaces 102 of the midline pipe fitting shell 41A. In particular, to facilitate sealing pipe segment tubing 22 in the first tubing cavity 54A, as depicted, a slanted seal groove 98B is implemented circumferentially along a first outer surface 86A of the fitting tube 44A. Additionally, to facilitate sealing pipe segment tubing 22 in the second tubing cavity 54, as depicted, another slanted seal groove 98B is implemented circumferentially along a second outer surface 86B of the fitting tube 44A.

However, it should be appreciated that the depicted example is merely intended to be illustrative and not limiting. In particular, in other embodiments, one or more slanted seal grooves 98B may additionally or alternatively be implemented along a first inner surface 84A of the first fitting jacket 50A and/or along a second inner surface 84B of the second fitting jacket 50B. Furthermore, in other embodiments, one or more quadrilateral (e.g., rectangular) seal grooves 98A of FIG. 7 may additionally or alternatively be implemented along corresponding fitting shell surfaces 102 of the midline pipe fitting shell 41A. Moreover, as described above, in other embodiments, one or more slanted seal grooves 98B of FIG. 8 may be implemented in a pipe end fitting 18.

Figure 10:
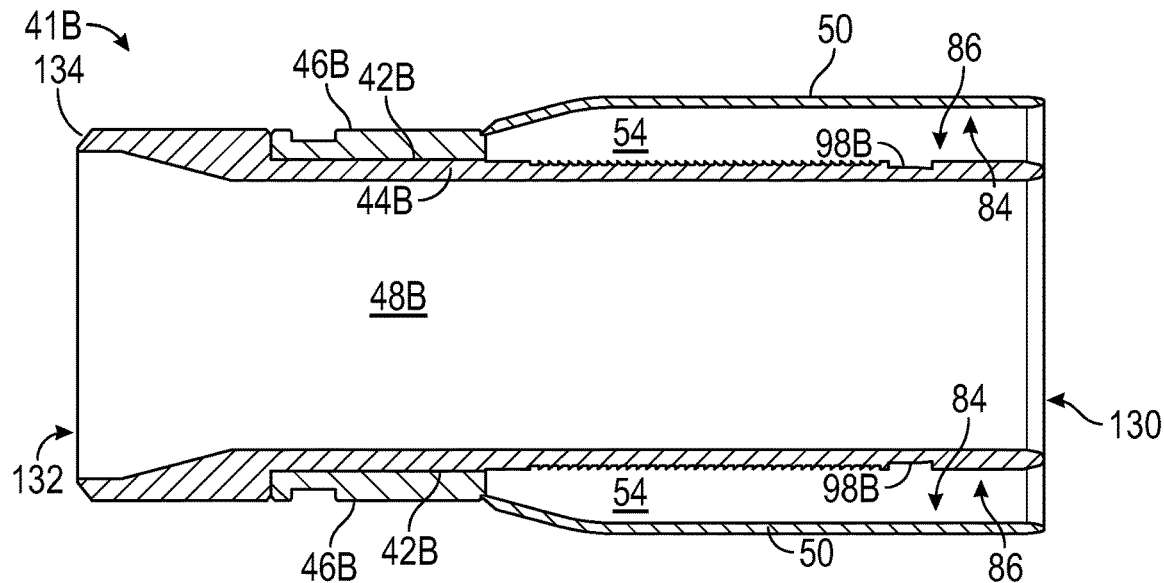
FIG. 10 is an axial cross-sectional view of another example of a fitting shell that includes the seal groove of FIG. 8, in accordance with an embodiment of the present disclosure.

To help illustrate, an example cross-section of a pipe end fitting shell 41B, which includes a slanted seal groove 98B, is shown in FIG. 10. As depicted, the pipe end fitting shell 41B includes a fitting jacket 50 and a fitting body 42B. Additionally, as depicted, the fitting body 42B includes a fitting tube 44B, which defines a fitting bore 48B, and a grab ring 46B, which is implemented around the fitting tube 44B.

In some embodiments, the grab ring 46B of FIG. 10 may generally match the grab ring 46 of FIG. 4. Additionally, in some embodiments, the fitting jacket 50 of FIG. 10 may generally match the second fitting jacket 50B of FIG. 4. In particular, as depicted, the fitting jacket 50 of FIG. 10 is implemented to facilitate defining a tubing cavity 54, which opens toward a first end 130 of the pipe end fitting shell 41B.

However, as depicted in FIG. 10, a second (e.g., opposite) end 132 of the pipe end fitting shell 41B includes a weld neck 134, which may be used to couple the pipe end fitting shell 41B and, thus, a corresponding pipe end fitting 18 to a bore fluid source 12 and/or a bore fluid destination 14, for example, at least in part by securing (e.g., welding) the weld neck 134 directly thereto and/or via a flange secured (e.g., welded) to the weld neck 134. Moreover, as in the depicted example, one or more slanted seal grooves 98B may be implemented along one or more corresponding shell surfaces 102 of the pipe end fitting shell 41B. In particular, to facilitate sealing pipe segment tubing 22 in the tubing cavity 54, as depicted, a slanted seal groove 98B is implemented circumferentially along an outer surface 86 of the fitting tube 44B.

However, it should be appreciated that the depicted example is merely intended to be illustrative and not limiting. In particular, in other embodiments, multiple slanted seal grooves 98B may be implemented along the outer surface 86 of the fitting tube 44B. Additionally or alternatively, in other embodiments, one or more quadrilateral (e.g., rectangular) seal grooves 98A of FIG. 7 may be implemented along corresponding fitting shell surfaces 102 of the pipe end fitting shell 41B. Moreover, in other embodiments, one or more slanted seal grooves 98B may additionally or alternatively be implemented along an inner surface 84 of the fitting jacket 50.

In any case, returning to FIG. 8, as depicted, a belt (e.g., flat) seal 99B is disposed in the slanted seal groove 98B to facilitate implementing the wedged protrusion profile fitting seal 52. In particular, when the belt seal 99B is disposed in the slanted seal groove 98B, as depicted, the wedged protrusion profile fitting seal 52 includes a flush seal corner 94B, which is substantially (e.g., relatively) flush with the fitting shell surface 102, and a protruding seal corner 96B, which protrudes beyond the fitting shell surface 102, for example, by one or more orders of magnitude more than the flush seal corner 94B. Additionally, as depicted, the wedged protrusion profile fitting seal 52 includes a slanted protruding seal surface 97B, which is connected between the flush seal corner 94B and the protruding seal corner 96B.

As described above, in some embodiments, a belt seal 99 used in a wedged protrusion profile fitting seal 52 may be implemented using elastic material and, thus, a recessed portion of the wedged protrusion profile fitting seal 52 may generally conform with a corresponding seal groove 98 in which the is belt seal 99 is disposed. For example, as depicted in FIG. 8, a first seal side surface 108B of the wedged protrusion profile fitting seal 52, which is connected to between the flush seal corner 94B and a first recessed seal corner 106B of the wedged protrusion profile fitting seal 52, generally conforms with a first groove side surface 112B of the slanted seal groove 98B such that the first recessed seal corner 106B is disposed in a first recessed groove corner 110B of the slanted seal groove 98B. Additionally, as depicted, a recessed portion of a second seal side surface 116B, which is connected to between the protruding seal corner 96B and a second recessed seal corner 114B of the wedged protrusion profile fitting seal 52, generally conforms with a second groove side surface 120B of the slanted seal groove 98B such that the second recessed seal corner 114B is disposed in a second recessed groove corner 118B of the slanted seal groove 98B.

Moreover, as depicted, a seal base surface 103B of the wedged protrusion profile fitting seal 52 generally conforms with the groove base surface 104B of the slanted seal groove 98B. In particular, as depicted, a first portion 136 of the seal base surface 103B generally conforms with the first (e.g., slanted) portion 126 of the groove base surface 104B and, thus, is slanted (e.g., angled at non-zero angle) relative to the fitting shell surface 102. Additionally, as depicted, a second portion 138 of the seal base surface 103B generally conforms with the second (e.g., parallel) portion 128 of the groove base surface 104B and, thus, is parallel (e.g., concentric) with the fitting shell surface 102.

In fact, in some embodiments, the conformation of the belt seal 99B to the slanted seal groove 98B may result in the axial cross-section profile of the wedged protrusion profile fitting seal 52 deviating from the default (e.g., unstretched, unstrained, and/or original) axial cross-section profile of the belt seal 99B. In particular, as depicted, when the belt seal 99B is disposed in the slanted seal groove 98B to implement the wedged protrusion profile fitting seal 52, it has a slanted and/or hexagonal-shaped axial cross-section profile. However, in some embodiments, before being disposed in the slanted seal groove 98, the belt seal 99B may have a quadrilateral-shaped (e.g., rectangular-shaped) axial cross-section profile. In other words, in such embodiments, the belt seal 99B of FIG. 8 may have a quadrilateral default axial cross-section profile and, thus, may be a quadrilateral (e.g., rectangular) belt seal 99B.

In any case, to facilitate implementing the flush seal corner 94B, as depicted, the recess depth of the first recessed groove corner 110B (e.g., length of first groove side surface 112B) generally matches the thickness of the wedged protrusion profile fitting seal 52 at the flush seal corner 94B (e.g., length of first seal side surface 108B), for example, while the recess depth of the second recessed groove corner 118B (e.g., length of second groove side surface 120B) is less than the thickness of the wedged protrusion profile fitting seal 52 at the flush seal corner 94B. However, as described above, in some embodiments, the wedged protrusion profile fitting seal 52 may be implemented using elastic material and, thus, the thickness of the wedged protrusion profile fitting seal 52 may differ from (e.g., be less than) the default thickness of the belt seal 99B. Thus, to facilitate implementing the flush seal corner 94B, in some such embodiments, the recess depth of the first recessed groove corner 110B may implemented to match an expected (e.g., stretched) thickness of the wedged protrusion profile fitting seal 52 that is expected to occur at the flush seal corner 94B when the belt seal 99B is disposed in the slanted seal groove 98B. In other such embodiments, a belt seal 99B to be disposed in the slanted seal groove 98A may be selected and/or designed such that the expected thickness at the flush corner 94B when disposed in the slanted seal groove 98B matches the recess depth of the first recessed groove corner 110B.

In any case, as described above, in some embodiments, the flush seal corner 94B of the wedged protrusion profile fitting seal 52 may be oriented toward the open end 88 of a corresponding tubing cavity 54 while the protruding seal corner 96B of the wedged protrusion profile fitting seal 52 may be oriented toward the closed end 90 of the tubing cavity 54. In other words, in such embodiments, the slanted protruding seal surface 97B, which is connected between the flush seal corner 94B and the protruding seal corner 96B, may be oriented toward the open end 88 of the tubing cavity 54. As such, implementing the wedged protrusion profile fitting seal 52 (e.g., belt seal 99B and quadrilateral seal groove 98B) in this manner may facilitate reducing the likelihood of pipe segment tubing 22 inadvertently catching on the wedged protrusion profile fitting seal 52 while being inserted into the tubing cavity 54, for example, due to the pipe segment tubing 22 instead sliding along the slanted protruding seal surface 97B of the wedged protrusion profile fitting seal 52. In other words, implementing a pipe fitting 18 in this manner may facilitate reducing the likelihood of a (e.g., wedged protrusion profile) fitting seal 52 inadvertently being displaced (e.g., rolled out) from a corresponding seal groove 98, which, at least in some instances, may facilitate improving sealing integrity and, thus, potentially perceived quality of the pipe fitting 18.

Figure 11:
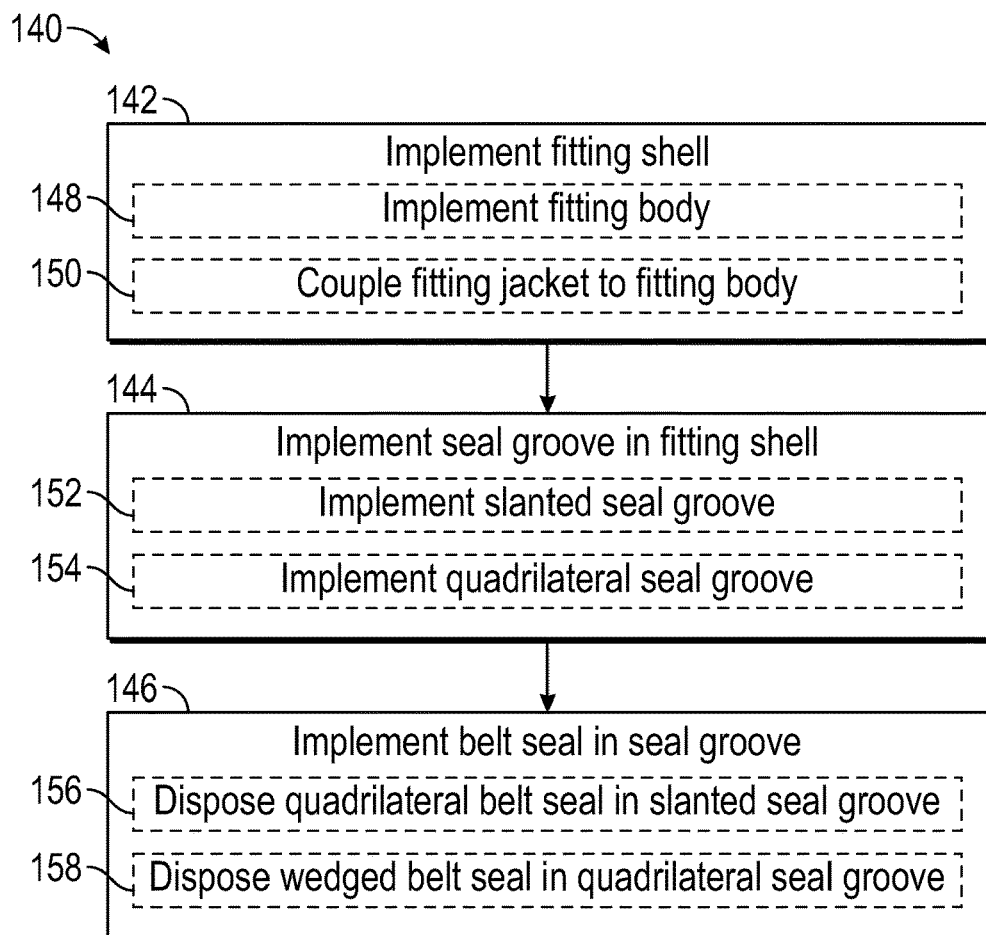
FIG. 11 is a flow diagram of an example of a process for implementing a pipe fitting with one or more wedged protrusion profile fitting seals, in accordance with an embodiment of the present disclosure.

To help further illustrate, an example of a process 140 for implementing a pipe fitting 18, which includes one or more wedge protrusion profile fitting seals 52, is described in FIG. 11. Generally, the process 140 includes implementing a fitting shell (process block 142) and implementing a seal groove in the fitting shell (process block 144). Additionally, the process 140 generally includes implementing a belt seal in the seal groove (process block 146).

Although described in a specific order, which corresponds with an embodiment of the present disclosure, it should be appreciated that the example process 140 is merely intended to be illustrative and not limiting. In particular, in other embodiments, a process 140 for implementing a pipe fitting 18 may include one or more additional process blocks and/or omit one or more of the depicted process blocks. Moreover, in other embodiments, one or more of the depicted process blocks may be performed in a different order. Merely as an illustrative non-limiting example, in some other embodiments, a seal groove 98 and/or a belt seal 99 may be implemented in a pipe fitting 18 before implementation of its fitting shell 41 has been completed, for example, such that the seal groove 98 and/or the belt seal 99 are implemented before a fitting jacket 50 is coupled to a corresponding fitting body 42.

In any case, as described above, a pipe fitting 18 generally includes a fitting shell 41. As such, implementing the pipe fitting 18 generally includes implementing its fitting shell 41 (process block 142). Additionally, as described above, in some embodiments, the fitting shell 41 of a pipe fitting 18 may include a fitting body 42 and one or more fitting jackets 50, which are coupled to the fitting body 42. In other words, in such embodiments, implementing the fitting shell 41 may include implementing a fitting body 42 (process block 148) and coupling one or more fitting jackets 50 to the fitting body 42 (process block 150).

Furthermore, as described above, in some embodiments, a fitting body 42 of a pipe fitting 18 may include a fitting tube 44, which is implemented to define (e.g., enclose) a fitting bore 48, and a grab ring 46, which is implemented around the fitting tube 44. In other words, in such embodiments, the fitting body 42 may be implemented at least in part by implementing (e.g., milling) a fitting tube 44 to define a fitting bore 48 and implementing (e.g., disposing) a grab ring 46 around the fitting tube 44. Additionally, in some embodiments, a fitting jacket 50 may be coupled to the fitting body 42 at least in part by welding the fitting jacket 50 to the grab ring 46 of the fitting body 42.

Moreover, to facilitate reducing the likelihood of inadvertent seal displacement, as described above, a pipe fitting 18 may include one or more seal grooves 98, which are each recessed in the fitting shell 41. In other words, implementing the pipe fitting 18 may include implementing one or more seal grooves 98 in its fitting shell 41 (process block 144). For example, in some embodiments, a seal groove 98 may be implemented in the fitting shell 41 at least in part by removing (e.g., milling) material from an outer surface 86 of its fitting tube 44. Additionally or alternatively, a seal groove 98 may be implemented in the fitting shell 41 at least in part by removing (e.g., milling) material from an inner surface 84 of a fitting jacket 50. In other words, a seal groove 98 may be implemented in the fitting shell 41 at least in part by accessing a corresponding fitting shell surface 102, such as the inner surface 84 of the fitting jacket 50 and/or the outer surface 86 of the fitting tube 44.

To facilitate improving access to a fitting shell surface 102, in some embodiments, the seal groove 98 may be implemented before the fitting shell 41 has been completely assembled. For example, in some such embodiments, a seal groove 98 may be implemented on the fitting tube 44 of the fitting body 42 before a fitting jacket 50 is coupled thereto. Additionally or alternatively, a seal groove 98 may be implemented on a fitting jacket 50 before the fitting jacket 50 is coupled to the fitting body 42.

Moreover, as described above with regard to FIG. 8, in some embodiments, a seal groove 98 in a fitting shell 41 may be a slanted seal groove 98B, which has groove base surface 104B that is at least partially slanted (e.g., angled at non-zero angle) relative to an adjacent fitting shell surface 102. In other words, in such embodiments, implementing the seal groove 98 may include implementing a slanted seal groove 98B in the fitting shell 41 (process block 152). Additionally, as described above with regard to FIG. 7, in some embodiments, a seal groove 98 in a fitting shell 41 may be a quadrilateral seal groove 98A, which has a groove base surface 104A that is parallel (e.g., concentric) with an adjacent fitting shell surface 102. In other words, in such embodiments, implementing the seal groove 98 may include implementing a quadrilateral seal groove 98A in the fitting shell 41 (process block 154).

To facilitate sealing pipe segment tubing 22 therein, as described above, a pipe fitting 18 may include one or more belt (e.g., flat) seals 99, which each have a multisided (e.g., quadrilateral or wedged) axial cross-section profile, implemented in corresponding seal grooves 98. In other words, implementing the pipe fitting 18 may include implementing (e.g., disposing) one or more belt seals 99 in corresponding seal grooves 98 (process block 146). As described above, in some embodiments, a belt seal 99 may be implemented using elastic material, such as rubber, and a default (e.g., unstretched, unstrained, and/or original) circumference of its seal base surface 103 may be less than the circumference of the groove base surface 104 of a corresponding seal groove 98. Thus, in such embodiments, the belt seal 99 may be disposed in the seal groove 98 at least in part by stretching and sliding the belt seal into the seal groove 98, thereby leveraging the desire of the belt seal 99 to return to its default circumference to facilitate securing the belt seal 99 in the seal groove 98.

In some embodiments, the belt seal 99 may additionally or alternatively be secured in the seal groove 98 in a different manner. For example, the belt seal 99 may be secured in the seal groove 98 at least in part using an adhesive, such as glue, implemented between the belt seal 99 and the seal groove 98. Additionally or alternatively, the belt seal 99 may be secured in the seal groove 98 at least in part using a clip that partially covers the seal groove 98. In any case, the belt seal 99 may be implemented in the seal groove 98 at least in part by accessing the seal groove 98.

To facilitate improving access to the seal groove 98, in some embodiments, the belt seal 99 may be implemented in the seal groove 98 before the fitting shell 41 has been completely assembled. For example, in some such embodiments, a belt seal 99 may be disposed in a seal groove 98 on the fitting tube 44 of the fitting body 42 before a fitting jacket 50 is coupled thereto. Additionally or alternatively, a belt seal 99 may be disposed in a seal groove 98 on a fitting jacket 50 before the fitting jacket 50 is coupled to the fitting body 42.

However, in other embodiments, the belt seal 99 may be implemented in the seal groove 98 after the fitting shell 41 has been completely assembled. In other words, in such embodiments, the belt seal 99 may be disposed in the seal groove 98 at least in part by inserting (e.g., sliding) the belt seal 99 through the open end 88 of a corresponding tubing cavity 54. In fact, in some such embodiments, the belt seal 99 may be implemented in the seal groove 98 by an entity that differs from the entity that implements the fitting shell 41 and/or the seal groove 98. For example, a manufacturer may implement the fitting shell 41 and the seal groove 98 in a manufacturing facility (e.g., plant) while the belt seal is disposed in the seal groove 98 by a service technician in the field.

In any case, as described above, disposing the belt seal 99 in the seal groove 98 may facilitate implementing a wedged protrusion profile fitting seal 52. In particular, as described above with regard to FIG. 8, in some embodiments, a wedged protrusion profile fitting seal 52 may be implemented at least in part by disposing a belt seal 99, which has a quadrilateral-shaped (e.g., rectangular-shaped) axial cross-section profile, in a slanted seal groove 98B (process block 156). Additionally, as described above with regard to FIG. 7, in some embodiments, a wedged protrusion profile fitting seal 52 may be implemented at least in part by disposing a belt seal 99, which has a wedge-shaped axial cross-section profile, in a quadrilateral seal groove 98A (process block 158).

In this manner, the techniques described in the present disclosure may facilitate implementing a pipe fitting with one or more wedged axial protrusion profile fitting seals. As described above, implementing a wedge axial protrusion profile fitting seal in accordance with the techniques described in the present disclosure may facilitate reducing the likelihood of the wedged protrusion profile fitting seal being inadvertently displaced from (e.g., rolled out of) a corresponding seal groove, for example, due at least in part to a seal corner of the wedged protrusion profile fitting seal, which is oriented toward an open end of a corresponding tubing cavity, being flush with an adjacent surface of the tubing cavity, thereby reducing the likelihood of pipe segment tubing being inserted into the tubing cavity catching on the seal corner. In other words, since sealing integrity is generally dependent on the surface area of engagement between a (e.g., wedged protrusion profile) fitting seal and pipe segment tubing, at least in some instances, implementing a pipe fitting in accordance with the techniques of the present disclosure may facilitate improving sealing integrity and, thus, potentially perceived quality of the pipe fitting.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe fitting, comprising:
   a fitting shell that defines a fitting bore through the pipe fitting and a tubing cavity around the fitting bore, wherein:
   the tubing cavity is configured to interface with pipe segment tubing to facilitate fluidly coupling the fitting bore to a pipe bore defined by the pipe segment tubing; and
   the fitting shell comprises a seal groove recessed into a fitting shell surface that facilitates defining the tubing cavity, wherein:
   the seal groove is configured to enable a belt seal to be disposed therein to implement a fitting seal in the pipe fitting that comprises:
      a protruding seal corner at a first end of the fitting seal that protrudes beyond the fitting shell surface and is oriented away from an opening of the tubing cavity;
      a first protruding seal surface that is connected to the protruding seal corner and parallel to the fitting shell surface;
      a flush seal corner at a second end of the fitting seal that is flush with the fitting shell surface and oriented toward the opening of the tubing cavity; and
      a second protruding seal surface that is connected to the flush seal corner and slanted relative to the fitting shell surface; and
   the seal groove has a groove base surface comprising:
      a first portion that is connected to a first recessed groove corner at a first end of the seal groove and angled at a non-zero angle relative to the fitting shell surface; and
      a second portion that is connected to a second recessed groove corner at a second end of the seal groove and parallel to the fitting shell surface.

2. The pipe fitting of claim 1, wherein the seal groove in the fitting shell is configured to enable the belt seal to be disposed therein to implement the fitting seal in the pipe fitting such that the fitting seal comprises a protruding portion having a wedge-shaped axial cross-section profile that protrudes beyond the fitting shell surface into the tubing cavity.

3. The pipe fitting of claim 1, wherein the seal groove is configured to enable the belt seal to be disposed therein to implement the fitting seal in the pipe fitting such that the fitting seal facilitates sealing a fluid conduit defined in an annulus of the pipe segment tubing within the tubing cavity of the pipe fitting.

4. The pipe fitting of claim 1, wherein:
   the fitting shell comprises:
      a fitting tube configured to define the fitting bore through the pipe fitting;
      a grab ring implemented around the fitting tube, wherein the grab ring is configured to be coupled to deployment equipment that operates to facilitate securing the pipe segment tubing in the tubing cavity of the pipe fitting; and
      a fitting jacket coupled to the grab ring to facilitate defining the tubing cavity between an inner surface of the fitting jacket and an outer surface of the fitting tube; and
   the seal groove is implemented circumferentially along the outer surface of the fitting tube or circumferentially along the inner surface of the fitting jacket.

5. The pipe fitting of claim 1, wherein the first recessed groove corner of the seal groove is more recessed than the second recessed groove corner of the seal groove.

6. A method of implementing a pipe fitting, comprising:
   implementing a fitting shell of the pipe fitting to define a fitting bore through the pipe fitting and a tubing cavity to be used to interface with tubing of a pipe segment at which the pipe fitting is to be deployed;
   removing material from a fitting shell surface of the fitting shell that is adjacent to the tubing cavity to define a seal groove in which a belt seal is to be disposed that comprises a groove base surface having:
      a first portion that is connected to a first recessed groove corner at a first end of the seal groove and angled at a non-zero angle relative to the fitting shell surface; and
      a second portion that is connected to a second recessed groove corner at a second end of the seal groove and parallel to the fitting shell surface; and
   disposing the belt seal in the seal groove to implement a fitting seal in the pipe fitting that comprises:
      a protruding seal corner at a first end of the fitting seal that protrudes beyond the fitting shell surface and is oriented away from an opening of the tubing cavity;
      a first protruding seal surface that is connected to the protruding seal corner and parallel to the fitting shell surface;
      a flush seal corner at a second end of the fitting seal that is flush with the fitting shell surface and oriented toward the opening of the tubing cavity; and a second protruding seal surface that is connected to the flush seal corner and slanted relative to the fitting shell surface.

7. The method of claim 6, wherein disposing the belt seal in the seal groove to implement the fitting seal in the pipe fitting comprises disposing the belt seal in the seal groove to implement the fitting seal such that the fitting seal comprises a protruding portion having a wedge-shaped axial cross-section profile that protrudes beyond the fitting shell surface into the tubing cavity.

8. The method of claim 6, wherein implementing the fitting shell comprises:
  implementing a fitting body to define the fitting bore through the pipe fitting; and
  coupling a fitting jacket to the fitting body to facilitate defining the tubing cavity between an inner surface of the fitting jacket and an outer surface of the fitting tube.

9. The method of claim 8, wherein:
  implementing the fitting body comprises:
    implementing a fitting tube to define the fitting bore through the pipe fitting; and
    implementing a grab ring around the fitting tube to enable deployment equipment that operates to conformally deform the fitting jacket around the tubing of the pipe segment to be coupled to the pipe fitting; and
  coupling the fitting jacket to the fitting body comprises coupling the fitting jacket to the grab ring.

10. The method of claim 8, wherein removing material from the fitting shell surface of the fitting shell to define the seal groove comprises:
  removing material from the inner surface of the fitting jacket before the fitting jacket is coupled to the fitting body; or
  removing material from the outer surface of the fitting body before the fitting jacket is coupled to the fitting body.

11. A pipe fitting, comprising:
  a fitting shell that defines:
    a fitting bore through the pipe fitting;
    a tubing cavity concentric with the fitting bore, wherein the tubing cavity is configured to interface with pipe segment tubing; and
    a seal groove along a fitting shell surface adjacent to the tubing cavity such that the seal groove opens to the tubing cavity; and
  a fitting seal implemented at least in part by disposing a belt seal within the seal groove defined in the fitting shell, wherein the fitting seal comprises:
    a protruding seal corner at a first end of the fitting seal that protrudes beyond the fitting shell surface and is oriented away from an open end of the tubing cavity;
    a first protruding seal surface that is connected to the protruding seal corner and parallel to the fitting shell surface;
    a flush seal corner at a second end of the fitting seal that is flush with the fitting shell surface and oriented toward the open end of the tubing cavity; and
    a second protruding seal surface that is connected to the flush seal corner and slanted relative to the fitting shell surface.

12. The pipe fitting of claim 11, wherein the seal groove defined in the fitting shell comprises a groove base surface having:
  a first portion that is connected to a first recessed groove corner at a first end of the seal groove and angled at a non-zero angle relative to the fitting shell surface; and
  a second portion that is connected to a second recessed groove corner at a second end of the seal groove and parallel to the fitting shell surface.

13. The pipe fitting of claim 11, wherein the second protruding seal surface of the fitting seal is oriented toward the open end of the tubing cavity.

14. The pipe fitting of claim 11, wherein the fitting shell comprises:
  a fitting tube that defines the fitting bore through the pipe fitting;
  a grab ring implemented around the fitting tube, wherein the grab ring is configured to be coupled to deployment equipment that operates to facilitate securing the pipe segment tubing in the tubing cavity of the pipe fitting; and
  a fitting jacket coupled to the grab ring to facilitate defining the tubing cavity between an inner surface of the fitting jacket and an outer surface of the fitting tube.

15. The pipe fitting of claim 14, wherein the seal groove is defined along the inner surface of the fitting jacket or along the outer surface of the fitting tube.

16. The pipe fitting of claim 11, wherein:
  the seal groove defined in the fitting shell comprises a groove base surface that is parallel to the fitting shell surface; and
  the belt seal comprises a wedge-shaped axial cross-section profile before being disposed in the seal groove to implement the fitting seal.

17. The pipe fitting of claim 16, wherein a corner of the belt seal is removed before being disposed in the seal groove to implement the fitting seal.

18. The pipe fitting of claim 11, wherein the fitting seal is configured to facilitate sealing a fluid conduit defined within an annulus of the pipe segment tubing within the pipe fitting.

* * * * *